Figure 1:
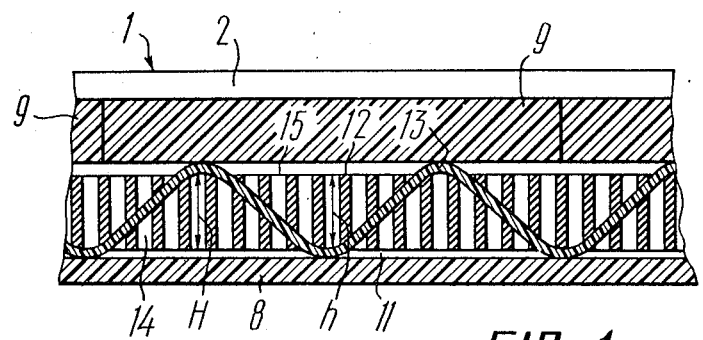

United States Patent [19]

Tsirkin et al.

[11] 4,117,362
[45] Sep. 26, 1978

[54] RIPPLE-SHAPED TIGHTENING STRIP FOR RETAINING ELECTRIC MACHINE WINDING

[76] Inventors: Mark Zakharovich Tsirkin, ulitsa Bela Kuna, 22, korpus 2, kv. 59; Viktor Ovshievich Kogan, Varshavskaya ulitsa, 53, kv. 36; Rudolf Semenovich Polyakov, Liteiny prospekt, 64, kv. 27; Jury Leonidovich Presnov, Moskovskoe shosse, 4, kv. 76; Elina Sergeevna Khanukova, prospekt Maiorova, 45, kv. 20, all of Leningrad, U.S.S.R.

[21] Appl. No.: 788,924

[22] Filed: Apr. 19, 1977

[51] Int. Cl.² ............................................. H02K 3/48
[52] U.S. Cl. .................................................. 310/214
[58] Field of Search ................. 310/194, 214, 215, 43, 310/216, 218

[56] References Cited

U.S. PATENT DOCUMENTS

| 1,555,065 | 9/1925 | Lindquist | 310/214 |
| 2,922,058 | 1/1960 | Bacon | 310/214 |
| 2,945,140 | 7/1960 | Drabik et al. | 310/214 |
| 3,009,073 | 11/1961 | Drabik et al. | 310/214 |
| 3,243,622 | 3/1966 | Whittlesey | 310/214 |
| 3,391,294 | 7/1968 | Moxie et al. | 310/214 |
| 3,393,335 | 7/1968 | Pletenik et al. | 310/214 |
| 3,594,597 | 7/1971 | Kildishev et al. | 310/214 |
| 3,780,325 | 12/1973 | Frankenhauser | 310/214 |
| 3,949,255 | 4/1976 | Brown et al. | 310/214 |
| 3,976,901 | 8/1976 | Liptak et al. | 310/214 |

Primary Examiner—Donovan F. Duggan
Attorney, Agent, or Firm—Lackenbach, Lilling & Siegel

[57] ABSTRACT

A ripple-shaped tightening strip disposed in radial slots of the core of an electric machine stator between the slot wedge and winding bar and comprising a rippled insulating member and an elastomeric resilient member fixed in the troughs of the rippled member. Such a strip has an increased strength, provides for a considerable total radial force provides for a sufficient take-up of the clearance between the slot wedge and the winding bar to compensate for its variations in a radial direction, caused by heat and electromagnetic forces when the electric machine is in operation.

7 Claims, 2 Drawing Figures

U.S. Patent  Sept. 26, 1978  4,117,362

RIPPLE-SHAPED TIGHTENING STRIP FOR RETAINING ELECTRIC MACHINE WINDING

The present invention relates to an arrangement for retaining electric windings within the core slots of an electric machine, and more particularly it relates to ripple-shaped tightening strips for retaining electric machine windings within the radial slots of the stator core.

The present invention can be most successfully used in devices for retaining winding bars within the radial slots of the core so as to reduce periodic radial and tangential vibrations exhibited by the bars when acted upon by the electrodynamic forces occurring in the course of operation.

In the stator of an electric machine, such as a heavy-duty alternator, the bars of the electric windings are disposed in the radial slots of the core. The bars are generally rectangular in cross section and are held in place in the slots by means of dovetail slot wedges, in order to restrict the movement caused by electromagnetic forces. For taking any the clearance between the slot wedge and the upper bar, tightening members in the form of resilient strips are employed; and they are disposed between the bottom of the slot wedge and the adjacent upper surface of the winding bar.

Increases in the unit power of electric generators, accompanied by a considerable increase in the linear load and electrodynamic forces in the winding bars with an associated rise in the temperature gradient thereacross, as well as the use of thermosetting insulation having improved mechanical and electric properties (but generally not capable of self-packing due to a certain amount of bulging, as is the case with the previously used thermoplastic insulation), have made it necessary to provide a reliable fit of the winding bars within the core slots.

An imperfect fit of the bars within the core slots is caused by insufficient resiliency of the tightening members employed, their aging, and radial clearances in the slot, between the bottom of the slot, the conductor bars, and the slot wedges, which generally occur at the end of a certain period of operation.

The lack of reliable fit of a the winding bars in the core slots results in periodic radial vibrations of the bars within the slots when the generator is in operation, which may even resonate under certain conditions. Such conditions further leading to severe erosional damage of bar insulation due to the effect of slot discharges caused by the interruption of capacitive current as the bars are moved, cracking of the conducting strands, mechanical abrasion of the insulation and its consequent breakdown, and finally, to noise generation. These faults are so significant that they appreciably reduce the life of the electric machine, necessitating more frequent repairs.

These are several ways of damping periodic vibrations of the bars in the slots.

Prior art solutions have included lateral tightening members in the form of either counter-wedges or ripple springs extending over the entire length of the slot along the winding bars and at the side thereof. Although the lateral strip arrangement, particularly of a rippled shape, does effectively dampen radial and tangential displacements of the bars, such lateral tightening tends to be rather complex and involves large lateral clearances in the slot, causing the thermal resistance of the winding to increase, especially in electric machines with indirect cooling, and resulting in an unduly high temperature gradient across the winding insulation. In addition, with such an arrangement, removal of any one of the lower bars from the slot leads to mechanical damage of the insulation of a considerable number of the upper winding bars.

It has also been known to retain the winding bars by means of resilient insulating strips of various configurations, extending longitudinally in the slot between the bars and the slot wedges. It has been proposed, for example, to provide means for retaining the bars with tightening insulating members in the form of a resilient strip generally of uniform thickness. Such arrangements, however, involved some complexity in the slot construction. Moreover, the strips used therein had insufficient resilience and compressibility, and abrasion of the insulation was observed in some cases due to a relative rigidity of these strips. It has also been proposed to use tightening members composed of elastomeric material, solid or perforated, but generally they did not provide sufficient allowance for broad variations of the space between the slot wedge and the winding bars. Further embodiments have included rippled resilient strips of elastomeric material, which, however, had an insufficient elastic force.

Furthermore, it has been standard practice to retain the bars in the slot by means of ripple-shaped tightening strips of rigid insulating material, extending longitudinally between the slot wedges and the bars. The effect of the elastic force exerted by such a strip in a radial direction is ensured by flattening the ripples of the strip as the slot wedges are driven into the core slot, or by straining the strip with special plugs screwed into the slot wedge after it has been driven in place.

Tightening the assembly by means of rigid rippled strips disposed between the slot wedge and the bar, despite the relative simplicity of installing the slot wedge, does not provide for:

1. The required resilience, since the maximum elastic force of such a strip is not achieved before it has been almost completely flattened out, resulting generally either in destruction of the strip or even in damage to the insulation, while insufficient resilience contributes to vibration of the bars within the slot;

2. The required uniform pressure on the conductor bars because of the small area of contact between such tightening strips and the slot wedge due to the unavoidable surface microroughness of the bar and the strips and, primarily, because of the inherent strip rigidity, resulting in objectionably increased local pressures on the insulation and relieving longer portions of the bar with a consequent increase in vibration of the bars in the slot;

3. The required taking-up of the clearance between the slot wedge and the bars, because of a rapid change in the elastic force as a function of the degree of flattening of the strip on the working portion of the curve, this being an inherent feature of rigid ripple-shaped strips, and this insufficient taking-up of the clearance likewise causing vibration of the bars to increase; and 4. The required strength of the rippled strip, since it operates with the ripples of the strip almost flattened out, when its inherent rigidity entails the danger of its being destroyed, thus resulting in a less reliable fit.

Finally, a device for retaining the winding, in which the elastic force is ensured by straining the rippled strip with the aid of special screwed-in plugs is also not capable of maintaining the required uniformity of compressing the bars, as it involves a higher complexity of constructions or a modification of the existing constructions of the complete assembly for securing the winding bars in the slot, which inherently involve or result in some looseness of the assembly.

In view of all these considerations, the efficiency of retaining the winding bars within the electric machine core slot tends to be insufficient and temperature-dependent, generally falling as the temperature is increased.

Accordingly, an object of the present invention is to provide an improved ripple-shaped tightening strip having an increased resilience and capable of taking up any looseness in the fit of the slot wedge over the winding bars in the radial slot of an electric machine stator core.

Another object of the present invention is to provide improved ripple-shaped tightening strip having an increased strength and capable of taking up any looseness in the fit of the slot wedge over the winding bars.

Still another object of the invention is to provide an improved ripple-shaped tightening strip for restricting periodic vibrations of the winding bars within the slot, caused by the effect of electrodynamic forces.

Yet another object of the invention is to prevent mechanical damage of the winding bars and their insulation and to minimize the noise caused by vibrations of the bars in the slot of an electric machine stator core.

A further object of the invention is to prevent mechanical damage of the bars, their insulation, and the tightening strips during installation and maintenance.

With these and other objects in view, there is proposed a ripple-shaped tightening strip for retaining the electric machine winding in the radial slots of the stator core, which is manufactured from a rigid insulating sheet material and is disposed between the winding bar and the slot wedge, being in a compressed state, and which includes, in accordance with the invention, additional resilient members placed in the troughs of the ripple-shaped tightening strip.

It is advisable that the additional resilient members be essentially of a partially cylindrical shape to match the troughs of the rippled tightening strip.

It is also advisable that the additional resilient members have a thickness smaller than the full depth of the troughs of the rippled tightening strip in its free, uncompressed state.

In accordance with one embodiment of the present invention, the additional resilient members are fixed in the troughs of the rippled strip by way of bonding.

In accordance with another embodiment of the invention, the additional resilient members are manufactured from a heat-resistant polymer material.

Still another embodiment of the invention consists in that the additional resilient members are composed of a polyester urethane-epoxy with an epoxy-group content of 6 to 10 per cent.

Yet another embodiment of the invention consists in that the additional resilient members are composed of low-molecular methyl-phenyl-siloxane synthetic rubber.

Insertion of the slot wedges into the stator core slot with the use of such ripple-shaped tightening strips is effected without complicating the newly designed or modyfying the existing slot-and-wedge construction.

Separation of the resilient polymer layer by the rigid material of the rippled strip permits a conventional insertion of the slot wedges without damaging the polymer layer.

The lateral clearance for accommodating the bars when using such a strip may sometimes be narrowed, resulting in a better filling-in of the slot and improved thermal conditions of the winding, as well as high maintainability of the machine as a whole.

Figure 2:
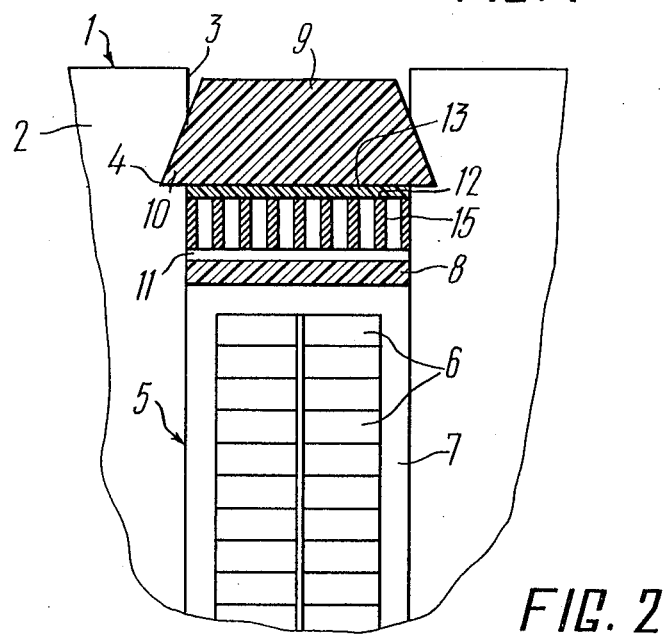

These and other objects and advantages of the present invention will become apparent from the following detailed description of preferred embodiments thereof, taken in conjunction with the accompanying drawings, in which:

FIG. 1 is a partial longitudinal section view of a ripple-shaped tightening strip disposed in the stator core slot of an electric machine; and FIG. 2 is a typical cross sectional of the strip of FIG. 1.

Referring now to FIGS. 1 and 2, it will be seen that a magnetic core, such as a core 1 of an electric machine stator comprises a set of laminations 2 shaped so as to define, when stacked, a radial slot 3 in the core 1, extending longitudinally along the core 1.

Disposed in the slot 3 with a groove 4, on either side thereof, are electric machine winding bars 5 comprising a plurality of conductor strands 6 surrounded by an insulating layer 7. A flat insulating member or strip 8 is disposed on top of the bar 5. Extending along the slot 3 in the upper portion thereof are several abutting retaining members or slot wedges 9. The wedges 9, dovetail-shaped in cross section, are adapted to slide axially in the slot 3 by means of their teeth 10 which fit in the grooves 4 along the slot 3. The lower surface of the slot wedges 9 is spaced from the insulating strip 8 with a clearance 11 being provided therebetween.

Disposed in the space between the slot wedges 9 and the insulating strip 8 is a ripple-shaped tightening strip 12 having a varying configuration and including a rigidly resilient rippled member 13 in the form of an insulating strip and an elastomeric resilient member 15 disposed in troughs 14 of the rippled member 13, the resilient member 15 being essentially of a partially cylindrical shape to match the trough 14 of the rippled member 13. Although the drawing shows that the ripples of the member 13 are substantially high, it will be understood that this is slightly exaggerated for the sake of illustration. In fact, the rippled member 13 is flatter.

The insertion and operation of the ripple-shaped tightening strip are as follows.

After the bar 5 of the electric machine winding is inserted into the slot 3 of the core 1 and the slot wedge 9 is driven into place in the slot 3, the thickness of the insulating strip 8 is selected so as to provide a radial clearance 11 between the insulating strip 8 and the lower surface of the slot wedge 9 such that the wedge 9 may cause the rippled member 13 and the resilient means 15 of the ripple-shaped tightening strip 12 to be deformed to essentially half the depth "H" of the trough 14 of the uncompressed strip 12.

In operation, when electrodynamic forces and heat cause the winding bar 5 to deform within the slot 3, the resultant change in the clearance 11 is taken up by the ripple-shaped tightening strip 12. If the clearance is reduced, the ripple strip 12 being compressed becomes relatively flattened out due to some expansion of the rippled member 13 and some compression of the resilient member 15. The total elastic forces then radially act on the bottom base of the slot wedge 9 and the insulating strip 8 and, through the strip, on the upper surface of the bar 5. These forces prevent a further reduction of the clearance and, consequently, restrict radial displacement of the bar 5. If the clearance 11 is increased, the rippled tightening strip 12 will expand, still continuing to exert an effective radial force on the bar 5 caused by narrowing of the ripples of the rippled member 13 and by the expansion of the resilient member 15.

A sufficient total elastic force of the rippled member 13 and the resilient member 15 of the tightening strip 12 is ensured, the thickness "$h$" of the resilient member 15 being smaller than the full depth "$H$" of the trough 14 of the uncompressed tightening strip 12. For easier assembly of the slot wedge 9 in the slot 3, the resilient member 15 is firmly held in the troughs 14 of the rippled member 13, for example, by bonding. As the bar 5 is displaced due to the effect of heat, the resilience of the resilient member 15 is capable of compensating for the microroughness of that portion of the insulation of the bar 5 with which it is brought into contact.

It is most advantageous to manufacture the rippled tightening strip 12 from plastic materials capable of maintaining their resilient properties for long periods of time at the machine operating temperature and stress. Thus, the rippled member 13 of the tightening strip 12 is manufactured by moulding a glass fabric impregnated with a heat-resistant epoxy resin based thermosetting binder, while the resilient member 15 is made of silicone rubber such as low-molecular methyl-phenyl-siloxane synthetic rubber or from polyester urethane epoxy with an epoxy-group content of 6 to 10 per cent.

The resilient member 15 is secured in the troughs 14 of the rippled member 13 by means of pouring a cold-setting silicone compound onto the hard material of the rippled member 13. The polymer being in the fluid state penetrates into the pits and pores in the material. After the polymer has solidified, mechanical adhesion between the hard material and the polymer takes place. In another embodiment of the present invention, the resilient member 15 is secured to the material of the rippled member 13 by bonding, for example, with an adhesive based on an epoxy resin with polyethylene-polyamine.

The best results are obtained with the following dimensions of the rippled tightening strip:
thickness of the sheet material of the rippled member 13, from 0.7 to 1.1 mm;
length of a ripple of the sheet material of the rippled member 13, from 35 to 55 mm;
thickness of the resilient member 15, from 0.5 to 3.5 mm.

The proposed rippled tightening strip is advantageously used for retaining the stator winding bars for electrical generators with a power rating of up to 300 mw.

The rippled tightening strip in accordance with the present invention permits effective taking-up of the clearance between the slot wedge and the winding bar by means of a resilient polymer member held firmly in place in the troughs of the rippled member. For example, when such a strip was used, the winding bar vibration was 3 to 10 $\mu$m, this level being maintained for a long time under the joint influence of electromagnetic forces and thermal cycles with heating up to 130° C and cooling down to 20° C.

The rippled tightening strip also permits a greater compressive force to be exerted on the bar with deformation of both the rippled member and the resilient polymer member as the slot wedge is driven into place, than in the case of using the rippled member alone.

Thus, for example, the compressive force exerted on the rippled tightening strip described in the above embodiment of the invention, when the strip deforms to half the trough depth, is 15 to 20 kg/cm$^2$, whereas the compressive force on the rippled member alone, without the additional resilient polymer member, when deformed to the same limit, is 4 to 5 kg/cm$^2$. In addition, the force applied to lock the slot wedge in the slot is also maintained for a much longer period of time, thus resulting in a tight fit of the wedge.

It will be understood that this invention is not limited by the details of the embodiment herein described and shown, but other modifications of the invention can be made which will remain within the concept and scope thereof.

What is claimed is:

1. An arrangement for retaining windings of an electric machine to restrict movement of the winding bars in radial slots of the core, comprising:
   an insulated winding bar disposed in an open slot of the core;
   a member retaining said bar extending longitudinally along said slot and spaced from said bar by a clearance;
   a ripple-shaped tightening strip disposed in said clearance between said bar and said retaining member and being in a compressed state, said ripple-shaped tightening strip being composed of a rigid insulating, essentially sheet, material and having elastomeric resilient members disposed in the troughs of said rippled-shaped tightening strip.

2. An arrangement according to claim 1, in which said elastomeric resilient members are essentially of a partially cylindrical shape to match the troughs of said ripple-shaped tightening strip.

3. An arrangement according to claim 1, in which said elastomeric resilient members have a thickness smaller than the full depth of the troughs of said uncompressed ripple-shaped tightening strip.

4. An arrangement according to claim 1, in which said elastomeric resilient members are fixed in the troughs of said ripple-shaped tightening strip by means of bonding.

5. An arrangement according to claim 1, in which said elastomeric resilient members are composed of a heat-resistant polymer material.

6. An arrangement according to claim 5, in which said elastomeric resilient members are composed of polyester urethane epoxy with an epoxy-group content of 6 to 10 per cent.

7. An arrangement according to claim 5, in which said elastomeric resilient members are composed of low-molecular methyl-phenyl-siloxane synthetic rubber.

* * * * *